(12) United States Patent
Watanabe et al.

(10) Patent No.: US 8,590,667 B2
(45) Date of Patent: Nov. 26, 2013

(54) CRANKCASE OF INTERNAL COMBUSTION ENGINE (75) Inventors: Junya Watanabe, Saitama (JP); Atsushi Ogasawara, Saitama (JP); Masataka Tanaka, Saitama (JP); Satoru Nojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 297 days.

(21) Appl. No.: 13/071,588

(22) Filed: Mar. 25, 2011

(65) Prior Publication Data
US 2011/0239977 A1    Oct. 6, 2011

(30) Foreign Application Priority Data
Mar. 31, 2010   (JP) .................................. 2010-080660

(51) Int. Cl.
*F02B 77/13*   (2006.01)
*F02B 77/04*   (2006.01)
*F16F 5/00*    (2006.01)

(52) U.S. Cl.
USPC ............... 181/204; 123/195 A; 123/195 R; 123/198 E; 267/136; 267/140; 267/141; 248/638; 248/562; 248/566; 248/635; 181/205; 181/207; 181/209

(58) Field of Classification Search
USPC ....... 123/195 A, 195 R, 198 E; 267/136, 140, 267/141; 248/638, 562, 566, 635; 181/205, 181/204, 207, 209
See application file for complete search history.

(56) References Cited

U.S. PATENT DOCUMENTS

| | | | | |
|---|---|---|---|---|
| 1,977,896 A | * | 10/1934 | Saurer ........................... | 248/635 |
| 3,796,280 A | * | 3/1974 | Thien et al. ................... | 181/204 |
| 4,159,828 A | * | 7/1979 | Ostling et al. ................ | 277/500 |
| 4,197,826 A | * | 4/1980 | Fachbach et al. ......... | 123/198 E |
| 4,394,853 A | * | 7/1983 | Lopez-Crevillen et al. ......................... | 123/195 C |
| 4,509,475 A | * | 4/1985 | Visek ......................... | 123/195 A |
| 4,548,170 A | * | 10/1985 | Forsthuber et al. ....... | 123/195 A |
| 4,836,160 A | * | 6/1989 | Valev ......................... | 123/198 E |
| 5,681,072 A | * | 10/1997 | Stricker ....................... | 296/39.3 |
| 6,155,226 A | * | 12/2000 | Ozawa et al. ............. | 123/195 C |
| 6,349,918 B1 | * | 2/2002 | Bunker ......................... | 248/635 |
| 6,645,019 B1 | * | 11/2003 | Shiomi et al. ................... | 440/52 |
| 2003/0160397 A1 | * | 8/2003 | Sakata .......................... | 277/634 |
| 2009/0064642 A1 | * | 3/2009 | Sato et al. ..................... | 55/290 |

FOREIGN PATENT DOCUMENTS

JP   09-117098 A    5/1997
JP   2003-336543 A  11/2003

* cited by examiner

*Primary Examiner* — Thanh Truong
*Assistant Examiner* — Tea Holbrook
(74) *Attorney, Agent, or Firm* — Birch, Stewart, Kolasch & Birch, LLP (57) ABSTRACT

A crankcase of an internal combustion engine includes protruding portions formed on an outer surface of the crankcase which are constituted of a pair of left and right wall members, and a vibration isolating rubber is fitted between the wall members. The crankcase configured in this manner prevents the generation of sounds from a protruding portion of the crankcase and is light-weight.

20 Claims, 9 Drawing Sheets

CRANKCASE OF INTERNAL COMBUSTION ENGINE

CROSS-REFERENCE TO RELATED APPLICATION

The present application claims priority under 35 U.S.C. §119 to Japanese Patent Application No. 2010-080660, filed Mar. 31, 2010, the entire contents of which are hereby incorporated by reference.

BACKGROUND OF THE INVENTION

1. Field of the Invention

The present invention relates to a crankcase of an internal combustion engine.

2. Description of Background Art

A crankcase which is one of casings used in an internal combustion engine is required to possess case rigidity. Conventionally, there has been known the constitution in which a product height is ensured to increase case rigidity or the constitution in which concave and convex portions are formed on a wall surface of the crankcase in cross section so as to ensure case rigidity with respect to a miniaturized vehicle such as a motorcycle whose height cannot be increased (see JPA-2003-336543, for example).

However, with respect to the constitution in which a protruding portion is formed on an outer surface of a crankcase, and a boss for mounting an engine is mounted by way of the protruding portion, the protruding portion is vibrated resonating with vibrations generated from the inside of the engine thus giving rise to a possibility that resonance sounds are generated.

To cope with the generation of resonance sounds, it may be possible to increase strength of the protruding portion. In this case, however, a thickness of the protruding portion is increased thus giving rise to a drawback that the weight of the crankcase is increased.

The present invention has been made in view of the above-mentioned circumstances, and it is an object of the present invention to provide a crankcase of an internal combustion engine which can prevent the generation of sounds from a protruding portion of the crankcase and can be light-weighted.

SUMMARY AND OBJECTS OF THE INVENTION

To overcome the above-mentioned drawback, an embodiment of the present invention is directed to a crankcase of an internal combustion engine in which a boss (202) is formed on an outer surface of a crankcase (3) by way of a protruding portion (212), wherein the protruding portion (212) is constituted of a pair of left and right wall members (212A, 212B), and a vibration isolating rubber (301) is fitted between the wall members (212A, 212B).

In such a constitution, the protruding portion is constituted of the pair of left and right wall members and the vibration isolating rubber is fitted between the wall members and hence, it is possible to prevent the generation of sounds from the protruding portion, and it is no more necessary to increase the strength of the protruding portion by increasing a thickness of the protruding portion or the like for preventing the generation of sounds. Accordingly, the generation of sounds from the protruding portion can be prevented and the crankcase can be made light-weighted.

In the above-mentioned constitution, the protruding portion (212) may be formed on a bottom surface of the crankcase (3), and a portion of the vibration isolating rubber (301) may be fitted upward from the bottom surface of the crankcase (3) such that the vibration isolating rubber (301) is prevented from being removed by a flange portion (381, 382) formed on an upper end of an oil pan (3G).

In such a constitution, the removal of the vibration isolating rubber is prevented by the flange portion formed on the upper end of the oil pan and hence, the prevention of the removal of the vibration isolating rubber can be achieved simultaneously with the mounting of the oil pan on the crankcase without using a special stopper whereby it is possible to realize the enhancement of the operability and the reduction of cost.

In the above-mentioned constitution, the protruding portion (212) may protrude in an approximately triangular shape with the boss (202) forming a vertex of the approximately triangular shape, the vibration isolating rubber (301) may be divided into a portion (311) which is inserted from a lower end side of the crankcase (3) and a portion (312) which is inserted from a side-surface side of the crankcase (3), and both portions (311, 312) may be integrally connected to each other by a connecting portion (313) which surrounds an outer periphery of the boss (202). Due to such a constitution, parts are hardly removed at the time of performing an operation of mounting respective parts of the vibration isolating rubber and hence, the operability can be enhanced. Further, the number of parts can be reduced so that the parts management can be easily performed.

Further, in the above-mentioned constitution, a rib (222, 223) which connects both wall members (212A, 212B) of the protruding portion (212) to each other is formed on both wall members (212A, 212B), and recessed portion (311A, 312A) into which the rib (222, 223) is fitted may be formed on the vibration isolating rubber (301). Due to such a constitution, it is possible to make the removal of the vibration isolating rubber more difficult while increasing the strength of the protruding portion.

Further, in the above-mentioned constitution, a thickness of an inserting distal end portion of the vibration isolating rubber (301) may be set smaller than a distance between both wall members (212A, 212B), and a thickness of a proximal end portion of the vibration isolating rubber (301) may be set larger than a distance between both wall members (212A, 212B). In such a constitution, the thickness of the inserting distal end portion of the vibration isolating rubber (301) is set smaller than the distance between both wall members and hence, the vibration isolating rubber can be easily inserted between both wall members. Further, the thickness of the proximal end portion of the vibration isolating rubber is set larger than the distance between both wall members and hence, it is possible to make the removal of the vibration isolating rubber difficult.

Advantageous Effects of the Invention Include the Following

According to an embodiment of the present invention, the protruding portion which is formed on the outer surface of the crankcase is constituted of the pair of left and right wall members and, at the same time, the vibration isolating rubber is fitted between the wall members. Due to such a constitution, the generation of sounds from the protruding portion can be prevented and the crankcase can be made light-weighted.

Further, the protruding portion is formed on the bottom surface of the crankcase, and a portion of the vibration isolating rubber is fitted upward from the bottom surface of the crankcase such that the vibration isolating rubber is prevented from being removed by the flange portion formed on the upper end of the oil pan. Due to such a constitution, the prevention of the removal of the vibration isolating rubber can be achieved simultaneously with the mounting of the oil pan on the crankcase without using a special stopper whereby it is possible to realize the enhancement of the operability and the reduction of cost.

Further, the protruding portion protrudes in an approximately triangular shape with the boss forming a vertex of the approximately triangular shape, the vibration isolating rubber is divided into the portion which is inserted from the lower end side of the crankcase and the portion which is inserted from a side-surface side of the crankcase, and both portions are integrally connected to each other by the connecting portion which surrounds the outer periphery of the boss. Due to such a constitution, parts are hardly removed at the time of performing an operation of mounting respective parts of the vibration isolating rubber and hence, the operability can be enhanced and, at the same time, the number of parts can be reduced so that the parts management can be easily performed.

Further, the rib which connects both wall members of the protruding portion to each other is formed on both wall members, and the recessed portion into which the rib is fitted is formed on the vibration isolating rubber. Due to such a constitution, it is possible to make the removal of the vibration isolating rubber more difficult while increasing the strength of the protruding portion.

Further, the thickness of the inserting distal end portion of the vibration isolating rubber is set smaller than the distance between both wall members, and the thickness of the proximal end portion of the vibration isolating rubber is set larger than the distance between both wall members. Due to such a constitution, the vibration isolating rubber can be easily inserted between both wall members and, at the same time, it is possible to make the removal of the vibration isolating rubber difficult.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, one embodiment of the present invention is explained in conjunction with drawings. In the explanation made hereinafter, directions of "front and rear", "left and right", and "up and down" are equal to the directions of a vehicle body unless otherwise specified. Further, in the drawings, an arrow F indicates a front side of the vehicle body, an arrow U indicates an upper side of the vehicle body, and an arrow L indicates a left side of the vehicle body.

Figure 1:
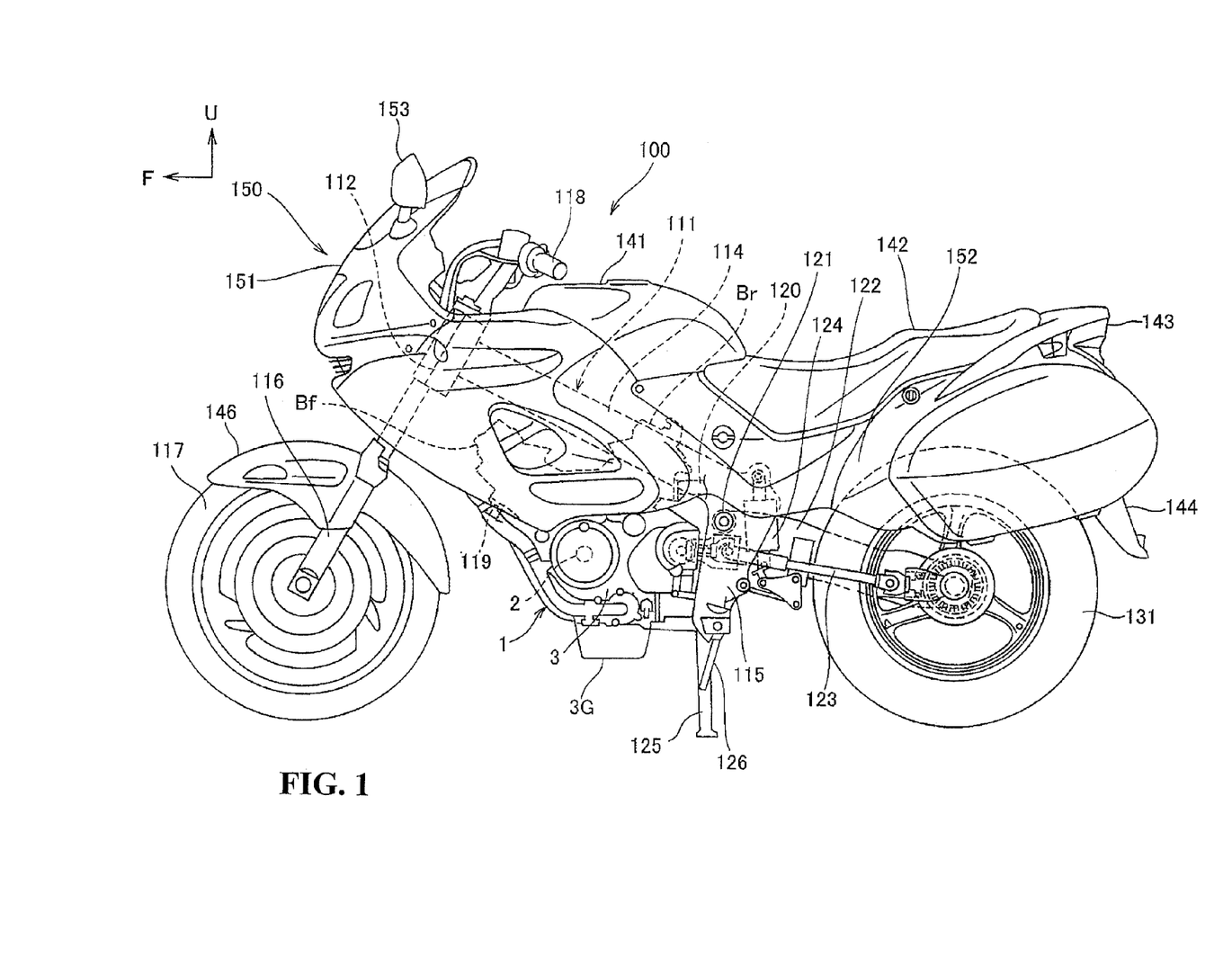
FIG. 1 is a side view of a motorcycle according to an embodiment of the present invention.

FIG. 1 is a side view showing a motorcycle according to the embodiment of the present invention.

A vehicle body frame 111 of a motorcycle 100 includes a head pipe 112 which is positioned at a front portion of the vehicle body, a pair of left and right main frames 114 which extends in the rearward direction from the head pipe 112 to the center of the vehicle body, a pair of left and right pivot plates 115 which extends in the downward direction from rear end portions of the main frames 114, and rear frames (not shown in the drawing) which extend from the rear end portions of the main frames 114 to a rear portion of the vehicle body. A front fork 116 is rotatably mounted on the head pipe 112, and a front wheel 117 is rotatably supported on a lower end of the front fork 116. A steering handle 118 is mounted on an upper portion of the head pipe 112.

A longitudinally-V-shaped four-cylinder internal combustion engine (also referred to as "engine" or "power unit") 1 is arranged below the main frames 114. The internal combustion engine 1 is a transverse engine in which a crankshaft 2 is directed in the lateral and horizontal direction. The internal combustion engine 1 is an OHC-type water-cooled engine. The internal combustion engine 1 is also a narrow-angle V-shaped engine where a metal-made crankcase 3 is provided, a metal-made front bank Bf and a metal-made rear bank Br each of which is formed of two cylinders are inclined in the frontward direction and in the rearward direction respectively from the crankcase 3 thus forming a V shape, and a bank angle made between the front bank Bf and the rear bank Br is set smaller than 90 degrees.

A pair of left and right exhaust pipes 119 has one ends thereof connected to exhaust ports of the front bank Bf. The left and right exhaust pipes 119 extend downward from the exhaust ports and, thereafter, are routed around toward a rear side of the vehicle body, and are connected and merged to a pair of left and right exhaust pipes 120 which extends from exhaust ports of the rear bank Br, and these exhaust pipes 119, 120 are connected to a muffler (not shown in the drawing) arranged behind the internal combustion engine 1 by way of one merged exhaust pipe (not shown in the drawing).

A pivot shaft 121 is arranged behind the internal combustion chamber 1, and a rear fork 122 is mounted on the pivot shaft 121 in a vertically swingable manner about the pivot shaft 121. A rear wheel 131 is rotatably supported on a rear end portion of the rear fork 122. The rear wheel 131 and the internal combustion engine 1 are connected to each other by a drive shaft 123 which is arranged in the inside of the rear fork 122, and a rotational force from the internal combustion engine 1 is transmitted to the rear wheel 131 by way of the drive shaft 123.

Further, a rear cushion 124 which absorbs an impact from the rear fork 122 extends between the rear fork 122 and the vehicle body frame 111. A stand 125 for parking the vehicle body is mounted on a rear portion of the internal combustion engine 1. A side stand 126 is mounted on a lower portion of a left-side surface of the internal combustion engine 1.

A fuel tank 141 is mounted on upper portions of the main frames 114 so as to cover the internal combustion engine 1 from above. A seat 142 is positioned behind the fuel tank 141, and the seat 142 is supported on the rear frames. A tail lamp 143 is arranged behind the seat 142, and a rear fender 144 which covers the rear wheel 131 from above is arranged below the tail lamp 143. Further, the motorcycle 100 includes a resin-made vehicle body cover 150 which covers the vehicle body, and the vehicle body cover 150 includes a front cover 151 which continuously covers an area from a front side of the vehicle body frame 111 to a front portion of the internal combustion engine 1, and a rear cover 152 which covers an area below the seat 142. A pair of left and right mirrors 153 is mounted on an upper portion of the front cover 151. Further, a front fender 146 which covers the front wheel 117 from above is mounted on the front fork 116.

Figure 2:
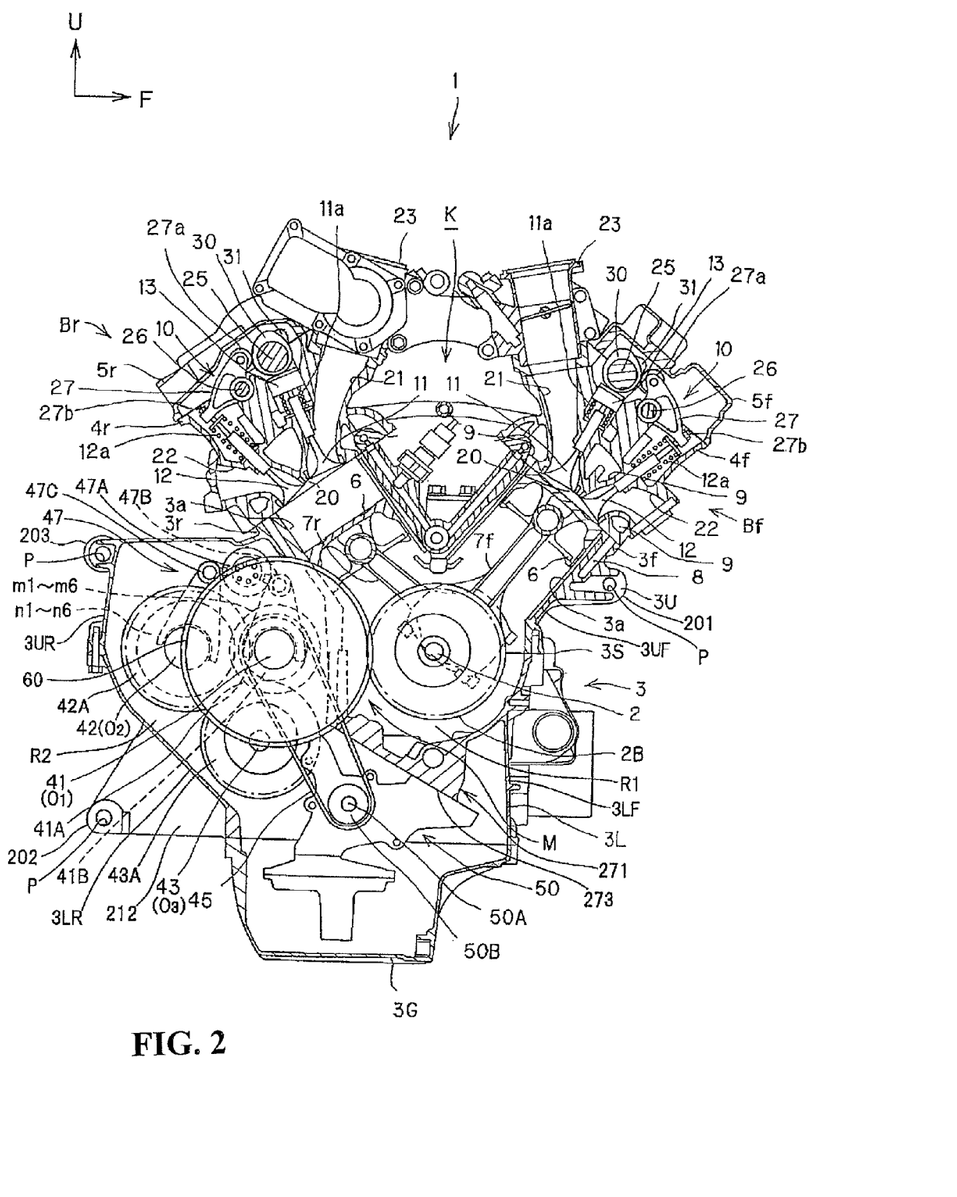
FIG. 2 is a cross-sectional side view of an internal combustion engine of the motorcycle.

FIG. 2 is a cross-sectional side view of the internal combustion engine 1.

A V bank space K which is a space formed into a V shape as viewed in a side view is defined between the front bank Bf and the rear bank Br.

The crankcase 3 has the vertically two-split structure, and includes an upper crankcase 3U and a lower crankcase 3L. The crankshaft 2 is rotatably and pivotally supported on the crankcases 3U and 3L parallel to the vehicle widthwise direction in a state where the crankshaft 2 is sandwiched between the upper crankcase 3U and the lower crankcase 3L. A front cylinder block 3f and a rear cylinder block 3r on each of which two cylinders are arranged are integrally formed on the upper crankcase 3U in an obliquely and upwardly extending manner so as to make a V shape as viewed in a side view.

A metal-made oil pan 3G in which oil (lubrication oil) for the internal combustion engine 1 is pooled is formed on a lower portion of the lower crankcase 3L in a downwardly bulging manner. An oil pump 50 which makes oil circulate in the inside of the internal combustion engine 1 is positioned below the crankshaft 2 in the inside of the lower crankcase 3L. A front cylinder head 4f overlaps to the front cylinder block 3f in the oblique frontward direction and is fastened to the cylinder block 3f using fastening bolts (not shown in the drawing), and a front cylinder head cover 5f covers the front cylinder head 4f from above. In the same manner, a rear cylinder head 4r overlaps to the rear cylinder block 3r in the oblique rearward direction and is fastened to the rear cylinder block 3r using fastening bolts (not shown in the drawing), and a rear cylinder head cover 5r covers the rear cylinder head 4r from above.

A cylinder bore 3a is formed in the front cylinder block 3f and the rear cylinder block 3r respectively, and a piston 6 which reciprocates in the inside of the cylinder bore 3a is arranged in the cylinder bore 3a. The respective pistons 6 are connected to one crankshaft 2 which is used in common by the respective pistons 6 by way of connecting rods 7f, 7r. Further, water jackets 8 in which cooling water for cooling the respective cylinder blocks 3f, 3r flows are formed in the cylinder blocks 3f, 3r respectively in a state where the water jackets 8 surround the cylinder bores 3a. A combustion chamber 20, an intake port 21, and an exhaust port 22 which are positioned above the cylinder bore 3a are formed in the front cylinder head 4f and the rear cylinder head 4r respectively.

Throttle bodies 23 which adjust a flow rate of an air-fuel mixture which flows into the respective intake ports 21 are connected to the intake ports 21 respectively. Further, water jackets 9 in which cooling water for cooling the respective cylinder heads 4f, 4r flows are formed in the cylinder heads 4f, 4r respectively in a state where the water jackets 9 surround the intake port 21 and the exhaust port 22. Further, on the respective cylinder heads 4f, 4r, a pair of intake valves 11 is arranged in an openable and closeable manner in a state where the pair of intake valves 11 is biased by valve springs 11a in the direction that the pair of intake valves 11 closes the intake ports 21 (valve closing direction) respectively, and a pair of exhaust valves 12 is arranged in an openable and closeable manner in a state where the pair of exhaust valves 12 is biased by valve springs 12a in the direction that the pair of exhaust valves 12 closes the exhaust ports 22 respectively. These intake valve 11 and the exhaust valve 12 are driven in an openable and closable manner by a "uni-cam-type" valve operating device 10 in which the intake valve 11 and the exhaust valve 12 are driven by camshafts 25 provided with one camshaft 25 for each cylinder head 4f, 4r.

A valve operating device 10 includes a camshaft 25 which is rotatably and pivotally supported on each cylinder head 4f, 4r arranged above the intake valve 11, a rocker shaft 26 which is fixed to each cylinder head 4f, 4r with an axis thereof arranged parallel to the camshaft 25, and a rocker arm 27 which is pivotally supported on the rocker shaft 26 in a rockable manner. The camshaft 25 includes an intake cam 30 and an exhaust cam 31 which project from an outer peripheral side of the camshaft 25, and is rotated in synchronism with the rotation of the crankshaft 2. The intake cam 30 and the exhaust cam 31 have a cam profile in which a distance from the center to an outer periphery (radius) is not a constant value respectively, and the intake valve 11 and the exhaust valve 12 are vertically moved corresponding to a change of the radius when the intake cam 30 and the exhaust cam 31 are rotated.

Further, a valve lifter 13 which is slidably fitted in the cylinder head 4f, 4r below the camshaft 25 is arranged between the camshaft 25 and the intake valve 11. A roller 27a which is brought into rolling contact with the exhaust cam 31 is mounted on one end of the rocker arm 27 which is pivotally supported on the rocker shaft 26, and a tappet screw 27b which is brought into contact with an upper end of the exhaust valve 12 is threadedly engaged with the other end of the rocker arm 27 in a state where an advancing/retracting position of the tappet screw 27b is adjustable. When the intake cam 30 and the exhaust cam 31 are rotated integrally with the camshaft 25, the intake cam 30 pushes down the intake valve 11 by way of the valve lifter 13 and the exhaust cam 31 pushes down the exhaust valve 12 by way of the rocker arm 27 so that the intake port 21 and the exhaust port 22 are opened/closed at predetermined timings which are determined in accordance with phases of rotation of the intake cam 30 and the exhaust cam 31.

A main shaft 41, a counter shaft 42 and an output shaft 43 which are arranged parallel to the crankshaft 2 respectively are disposed in the inside of the crankcase 3. The crankshaft 2, the main shaft 41 and the counter shaft 42 are arranged on a mating surface 3S between the upper crankcase 3U and the lower crankcase 3L, and the output shaft 43 is arranged in front of and below the counter shaft 42. That is, an axis O1 of the main shaft 41 and an axis O2 of the counter shaft 42 are positioned in a spaced-apart manner in the longitudinal direction on the mating surface 3S, and an axis O3 of the output shaft 43 is positioned behind the axis O1 of the main shaft 41 and in front of and below the axis O2 of the counter shaft 42. A crank-side drive gear 2B is fixed to an end of the crankshaft 2 on a cam chain chamber (not shown in the drawing) side, and the crank-side drive gear 2B is meshed with a main-shaft-side driven gear 41A of the main shaft 41.

The main-shaft-side driven gear 41A is mounted on the main shaft 41 in a relatively rotatable manner, and is connected to a clutch mechanism 60 which is mounted on one end side (right side) of the main shaft 41 in the vehicle widthwise direction. Due to an operation of the clutch mechanism 60, the transmission of power between the crankshaft 2 and the main shaft 41 can be established or interrupted.

An oil pump drive gear 41B is mounted on the main-shaft-side driven gear 41A. The oil pump drive gear 41B is rotated integrally with the main-shaft-side driven gear 41A irrelevant to the engagement and disengagement of the clutch mechanism 60, and transmits the rotation of the crankshaft 2 to a driven gear 50B which is fixed to a drive shaft 50A of the oil pump 50 by way of a drive chain 45 thus driving the oil pump 50.

Drive gears m1 to m6 which correspond to first to sixth speeds are mounted on the main shaft 41, and driven gears n1 to n6 which correspond to the first to sixth speeds are mounted on the counter shaft 42. The respective drive gears m1 to m6 and the respective driven gears n1 to n6 are meshed with each other in corresponding shift stages thus constituting shift-gear pairs (combinations of gears) corresponding to the respective shift stages.

An intermediate drive gear 42A which is rotated integrally with the counter shaft 42 is mounted on the counter shaft 42, and a driven gear 43A which is meshed with the intermediate drive gear 42A and is rotated integrally with the output shaft 43 is mounted on the output shaft 43.

Due to such a constitution, a drive force which is transmitted to the counter shaft 42 from the main shaft 41 with a change-gear ratio corresponding to the shift stage is transmitted to the output shaft 43 by way of the counter shaft 42, and is transmitted to the rear wheel 131 by way of the drive shaft 123 which is connected to the output shaft 43.

A transmission M of the internal combustion engine 1 is constituted of a twin-clutch-type transmission.

That is, the motorcycle 100 includes the twin-clutch-type clutch mechanism 60, a gear shift mechanism 47 which changes over a shift stage of the transmission M, and a shift control device which controls an operation of the gear shift mechanism 47 and an operation of the clutch mechanism 60. An automatic transmission which performs a shift manipulation (including both a clutch manipulation and a shift change manipulation) by an electronic control is constituted of these components.

The gear shift mechanism 47 includes a shift drum 47A which is arranged above and between the main shaft 41 and the counter shaft 42 and is also arranged parallel to these two shafts, and shift forks 47B, 47C which are positioned in front of and behind the shift drum 47A respectively and change gears to be meshed with each other between the main shaft 41 and the counter shaft 42. The shift control device rotatably drives the shift drum 47A so as to change a shift stage by way of the shift forks 47B, 47C. Here, a changeover of a shift stage is performed by a manual changeover method in which a shift stage is changed over in response to the manipulation of a predetermined manipulator by a rider or an automatic changeover method in which a shift stage is changed over corresponding to an engine load, a vehicle speed and the like.

As shown in FIG. 2, the internal combustion engine 1 includes front bosses 201 which are formed on a front side of the internal combustion engine 1, rear lower bosses 202 which are formed on a rear lower portion of the internal combustion engine 1, and rear upper bosses 203 which are formed on a rear upper portion of the internal combustion engine 1.

The front bosses 201 are integrally formed on a front wall 3UF of the upper crankcase 3U, the rear lower bosses 202 are integrally formed on the lower crankcase 3L at a position away from a rear wall 3LR by way of protruding portions 212 which protrude in the rearward and downward direction from the rear wall 3LR of the lower crankcase 3L, and the rear upper bosses 203 are integrally formed on a rear wall 3UR of the upper crankcase 3U.

A bolt-fastening-use boss hole P which extends in the vehicle widthwise direction is formed in these bosses 201 to 203. By fastening these bosses 201 to 203 and the vehicle body frame 111 to each other using bolts, the internal combustion engine 1 is fixed to the vehicle body frame 111.

In such a constitution, the rear lower bosses 202 are formed on distal ends of the protruding portions 212 which protrude in the rearward and downward direction and hence, the rear lower bosses 202 can be arranged at the positions away from other bosses 201, 203 in the longitudinal direction as well as in the vertical direction. Accordingly, it is possible to facilitate the properly setting of the connecting positions where the internal combustion engine 1 and the vehicle body frame 111 are connected to each other whereby the crankcase 3 can easily ensure the support rigidity.

Further, in the internal combustion engine 1, the rear wall 3LR of the lower crankcase 3L is formed into an inclined surface extending in the frontward and downward direction as viewed in a side view and hence, the crankcase 3 has a shape where a longitudinal length of the crankcase 3 is gradually decreased as the crankcase 3 extends in the downward direction. In the crankcase having such a shape, when the rear lower bosses 202 are directly formed on the rear wall 3LR of the lower crankcase 3L, the rear lower bosses 202 and the front bosses 201 are arranged extremely close to each other.

According to the constitution of this embodiment, by providing the protruding portions 212, a longitudinal distance between the rear lower bosses 202 and the front bosses 201 is increased, and the rear lower bosses 202 are arranged on a vertical extension of the rear upper bosses 203.

Figure 3:
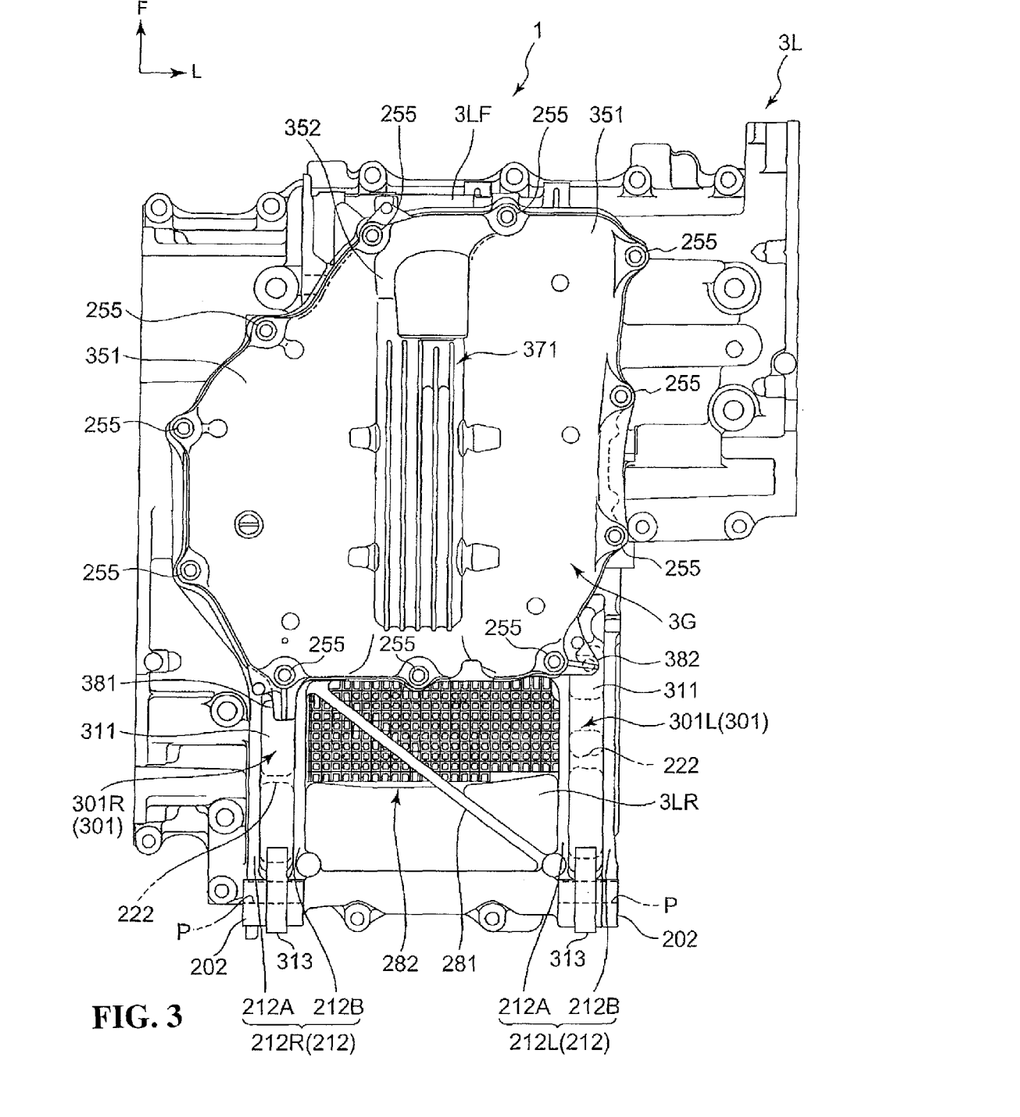
FIG. 3 is a view of the internal combustion engine as viewed from below.
Figure 4:
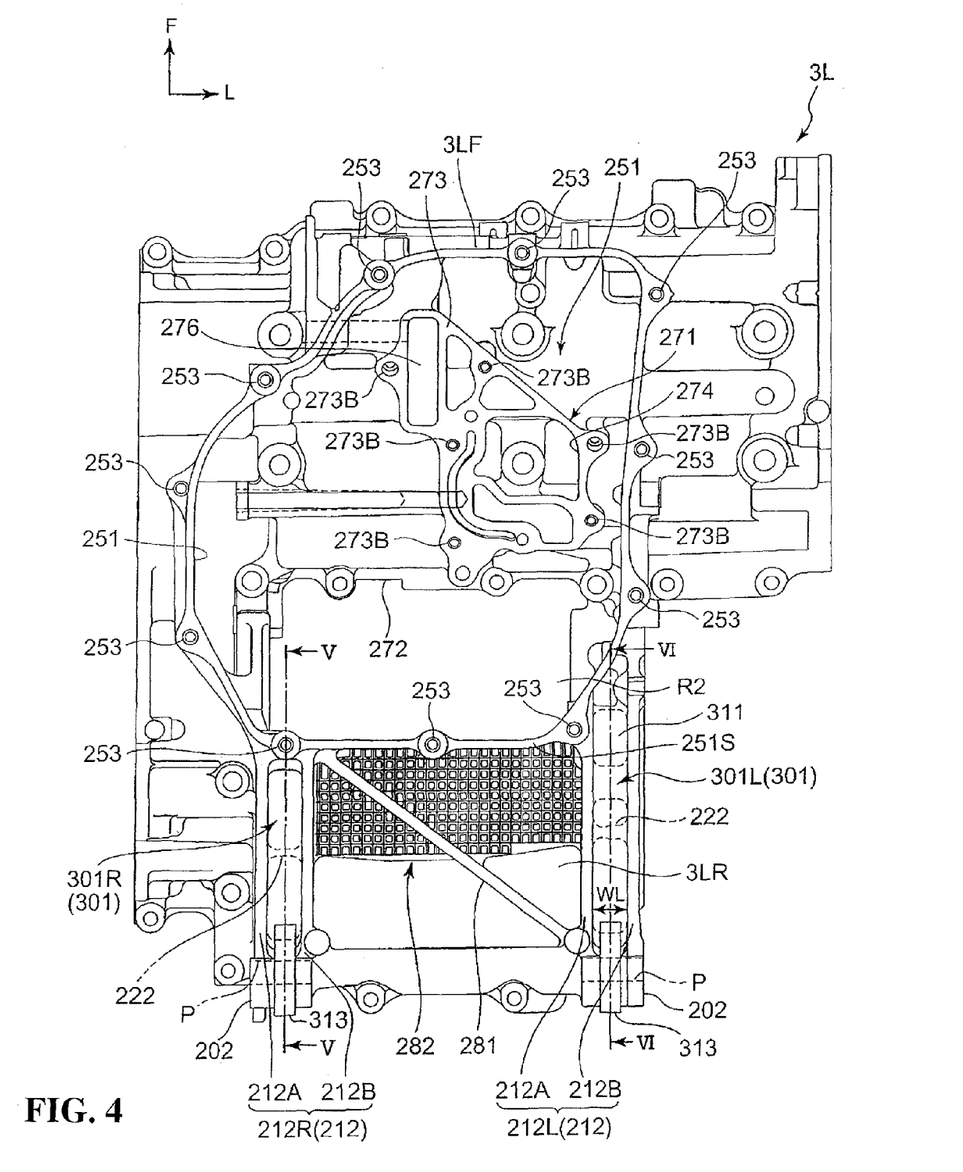
FIG. 4 is a view of a lower crankcase as viewed from below.

FIG. 3 is a view of the internal combustion engine 1 as viewed from below, and FIG. 4 is a view of the lower crankcase 3L as viewed from below. As shown in FIG. 3 and FIG. 4, the protruding portions 212 which are mounted on the rear wall 3LR of the lower crankcase 3L are arranged in a spaced-apart manner in the lateral direction. Further, the rear lower bosses 202 are integrally formed on distal end portions which constitute rear lower ends of the pair of left and right protruding portions 212 respectively.

As shown in FIG. 4, the lower crankcase 3L has a lower opening 251 which makes the inside of the lower crankcase 3L open in the downward direction, and the lower opening 251 is closed by the oil pan 3G.

The lower opening 251 opens between a lower end of the rear wall 3LR of the lower crankcase 3L and a lower end of the front wall 3LF of the lower crankcase 3L, an endlessly contiguous oil pan connecting surface 251S is formed along the periphery of the lower opening 251, and a plurality of oil-pan fastening holes 253 are formed in the oil pan connecting surface 251S. The oil pan 3G is fixed to the lower crankcase 3L using a plurality of bolts 255 (see FIG. 3) by way of the fastening holes 253.

As shown in FIG. 4, in a state where the oil pan 3G is removed, a bottom wall 271 which extends in the widthwise direction between left and right side walls 3LS in the inside of the lower crankcase 3L and a rear wall 272 which is contiguously formed with a rear end of the bottom wall 271 are exposed.

The bottom wall 271 extends below a crank chamber R1 (see FIG. 2) which houses the crankshaft 2 and the crank-side drive gear 2B therein, and an oil pump mounting surface 273 on which the oil pump 50 is mounted is formed on a lower surface of the bottom wall 271.

A plurality of fastening holes 273B for fixing the oil pump 50 using bolts and various opening portions 274, 276 which are communicated with the oil pump 50 are formed in the oil pump mounting surface 273. Further, the rear wall 272 extends in the vertical direction so as to partition the transmission chamber R2 (see FIG. 2) which houses the transmission M and the gear shift mechanism 47 therein and the crank chamber R1 from each other in the longitudinal direction.

Next, the rear wall 3LR of the lower crankcase 3L is explained.

As shown in FIG. 2, the rear wall 3LR is formed of an inclined wall which is inclined in the frontward and downward direction so as to approach a back surface side of the intermediate drive gear 42A mounted on the counter shaft 42 and a back surface side of the driven gear 43A mounted on the output shaft 43.

As shown in FIG. 4, on the rear wall 3LR, a brace-like first rib 281 which extends obliquely from a one-end-side upper portion (left upper corner portion) in the vehicle widthwise direction to an another-end-side lower portion (right lower corner portion) in the vehicle widthwise direction between the pair of left and right protruding portions 212 is formed. Also on the rear wall 3LR, a second rib 282 having a grid shape (ribs in a grid shape extending in the longitudinal direction and in the vehicle widthwise direction) is formed between the pair of left and right protruding portions 212. That is, by forming two kinds of ribs 281, 282 having shapes different from each other on the rear wall 3LR, it is possible to enhance the strength of the rear wall 3LR per se.

When the protruding portions 212 are formed on the crankcase 3 and the engine mounting bosses 202 are formed on the crankcase 3 by way of the protruding portions 212, there exists a possibility that the protruding portions 212 are vibrated resonating with vibrations generated from the inside of the engine thus generating resonance sounds. Further, the internal combustion engine 1 is a twin-clutch-type engine which can perform a shift manipulation within a short time and hence, there also exists a possibility that the protruding portions 212 are vibrated at the time of shifting and sounds are generated due to such vibrations.

On the other hand, the increase of the strength of the protruding portions 212 for preventing the generation of such sounds brings about the increase of the weight of the crankcase and hence, the increase of the strength of protruding portions 212 is not desirable.

In view of the above, according to this embodiment, the protruding portions 212 are constituted of a pair of left and right wall members 212A, 212B, and a vibration isolating rubber 301 is fitted between the pair of left and right wall members 212A, 212B.

In the explanation made hereinafter, when it is necessary to explain the protruding portions 212 by distinguishing the pair of left and right protruding portions 212 between left and right sides, the protruding portion 212 formed on the right side of the vehicle body is referred to as the first protruding portion 212R, and the protruding portion 212 formed on the left side of the vehicle body is referred to as the second protruding portion 212L. Further, when it is necessary to explain the vibration isolating rubbers 301 by distinguishing the pair of left and right vibration isolating rubbers 301 between left and right sides, the vibration isolating rubber 301 which is fitted into the first protruding portion 212R is referred to as the first vibration isolating rubber 301R, and the vibration isolating rubber 301 which is fitted into the second protruding portion 212L is referred to as the second vibration isolating rubber 301L.

Figure 5:
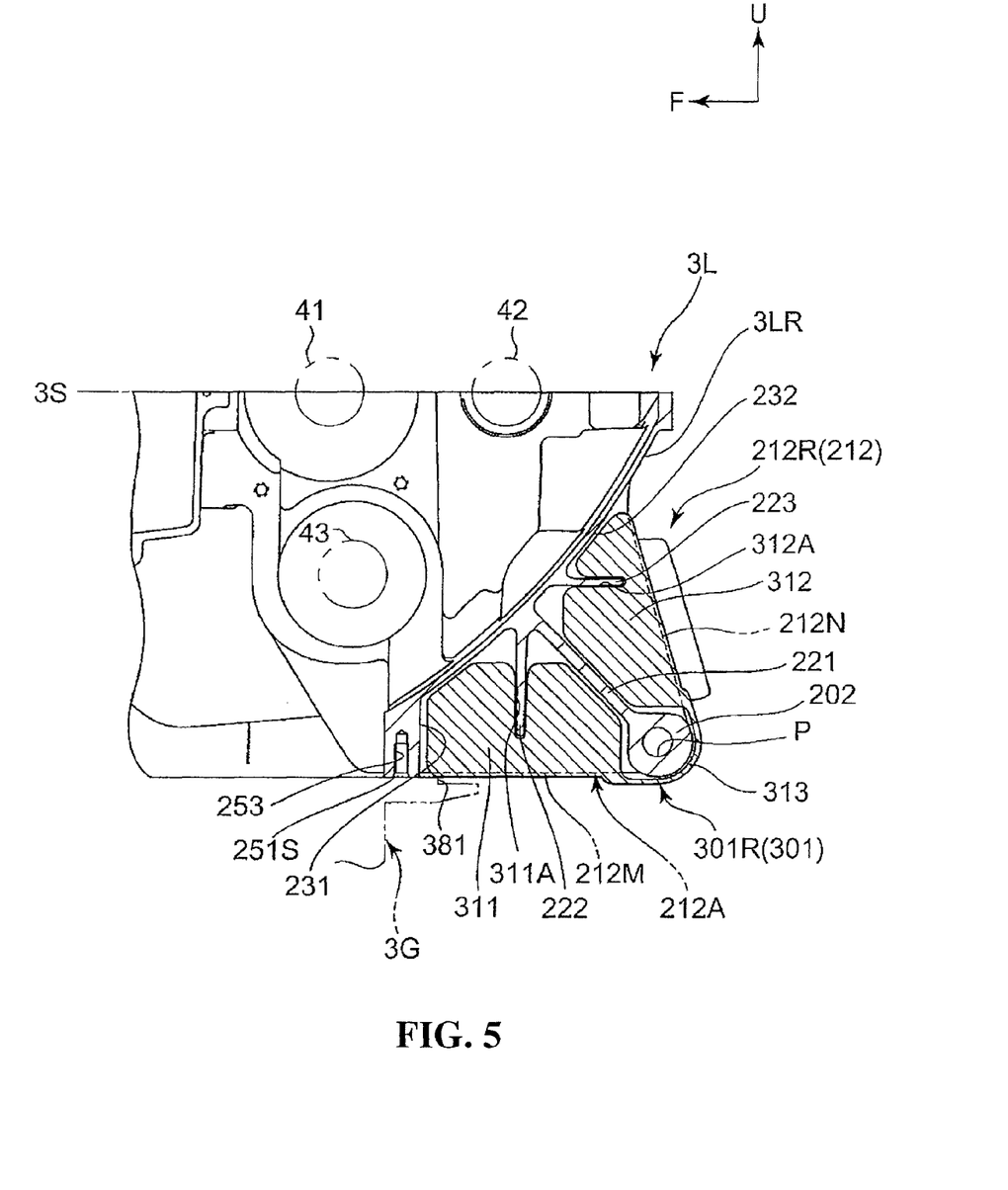
FIG. 5 is a cross-sectional view taken along a line V-V in FIG. 4.
Figure 6:
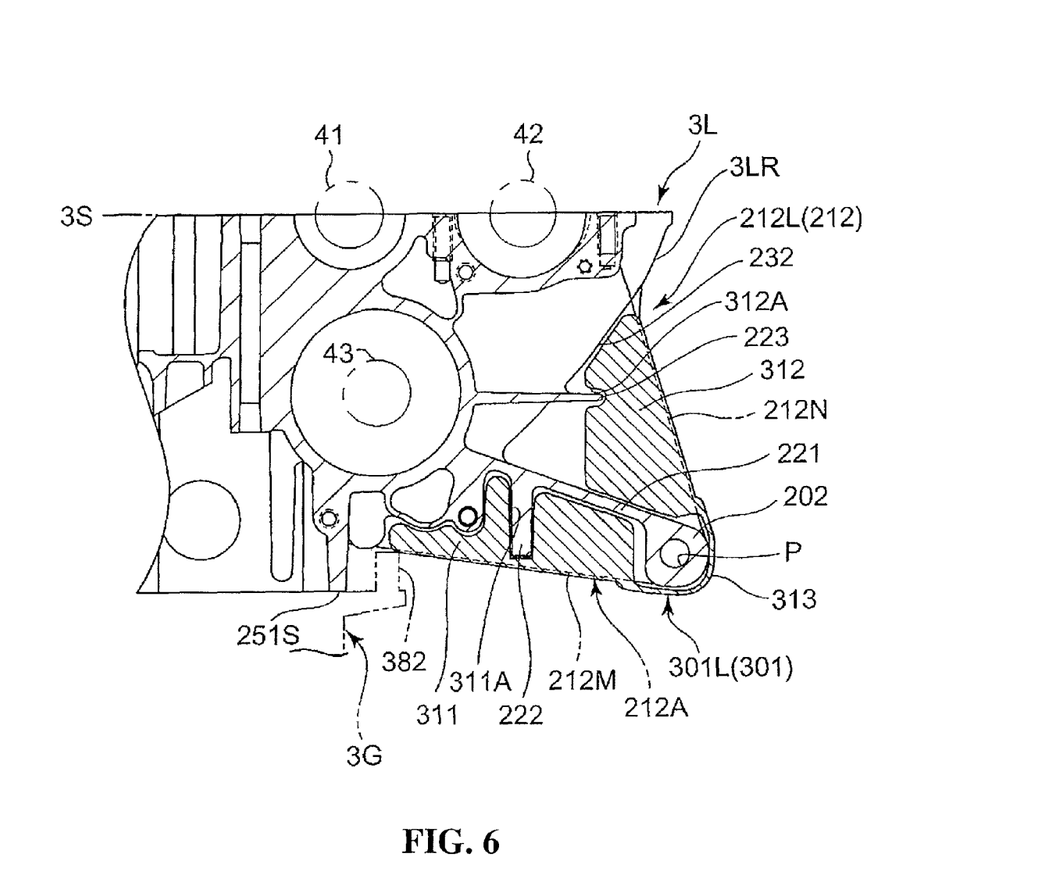
FIG. 6 is a cross-sectional view taken along a line VI-VI in FIG. 4.

FIG. 5 shows the cross-sectional structure of the protruding portion 212R (a cross section taken along a line V-V in FIG. 4), and FIG. 6 shows the cross-sectional structure of the protruding portion 212L (a cross section taken along a line VI-VI in FIG. 4).

Firstly, the first protruding portion 212R is explained.

A pair of left and right wall members 212A, 212B which constitutes the first protruding portion 212R is, as shown in FIG. 4, integrally formed with the lower crankcase 3L with a distance WR therebetween, and both wall members 212A, 212B has the same shape.

As shown in FIG. 5, a width of the wall member 212A is gradually narrowed as the wall member 212A extends in the rearward and downward direction from the rear wall 3LR of the lower crankcase 3L thus exhibiting an approximately triangular shape as viewed in a side view, and the rear lower boss 202 is formed on a vertex portion of the wall member 212A positioned at a rear lower end of the wall member 212A.

A lower surface 212M of the wall member 212A is formed of a surface (horizontal surface in the constitution of this embodiment) which extends along an oil pan connecting surface 251S constituting a bottom surface of the lower crankcase 3L. A back surface (side surface) 212N of the wall member 212A is formed of an inclined surface which is inclined in the rearward and downward direction from a position above the oil pan connecting surface 251S. Due to such a constitution, the wall member 212A is formed into a triangular shape having an acute angle (a vertex angle ranging from approximately 60° to 80° in the constitution of this embodiment) in which the rear lower boss 202 constitutes a vertex.

The wall member 212B has the same shape as the wall member 212A and is formed at a position where the wall member 212B and the wall member 212A overlap to each other as viewed in a side view and hence, the explanation of the shape and the like of the wall member 212B is omitted.

As shown in FIG. 4 and FIG. 5, between the left and right wall members 212A, 212B, the rear lower boss 202, a first rib 221 which is an inclined rib extending linearly in the rearward and downward direction between the rear wall 3LR and the rear lower boss 202, and a second rib 222 and a third rib 223 which make a vertical pair and extend linearly in the radial direction from a proximal end portion of the first rib 221 are formed. The rear lower boss 202 and the first to third ribs 221 to 223 extend between the left and right wall members 212A, 212B in the vehicle widthwise direction thus enhancing the connection strength between the left and right wall members 212A, 212B.

The second rib 222 is formed of a vertical rib extending in the vertical direction, and protrudes to a position in the vicinity of a bottom surface 212M of the wall members 212A, 212B. The third rib 223 is formed of a rib extending in the direction perpendicular to the second rib 222, that is, a horizontal rib extending in the horizontal and rearward direction, and the third rib 223 protrudes to a position in the vicinity of the back surface 212N of the wall members 212A, 212B.

In this manner, between the left and right wall members 212A, 212B, a first recessed portion 231 and a second recessed portion 232 which constitute a pair of recessed portions partitioned by the first rib 221 are formed. The first recessed portion 231 has a concave shape which opens on a lower end side of the crankcase 3, and the second recessed portion 232 has a concave shape which opens on a back surface side (side-surface side) of the crankcase 3.

Next, the first vibration isolating rubber 301R is explained.

Figure 7A:
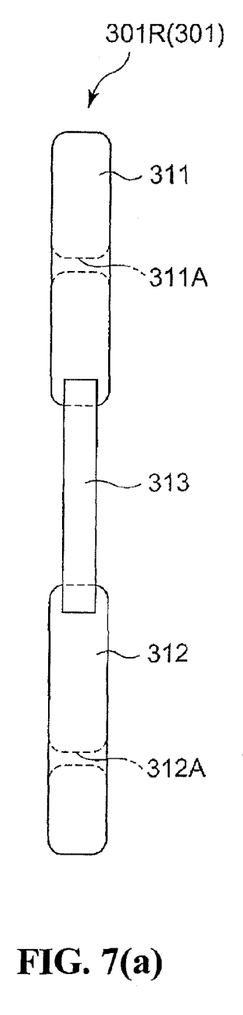
FIG. 7(a) is a front view of a first vibration isolating rubber.
Figures 7B, 7C, 7D:
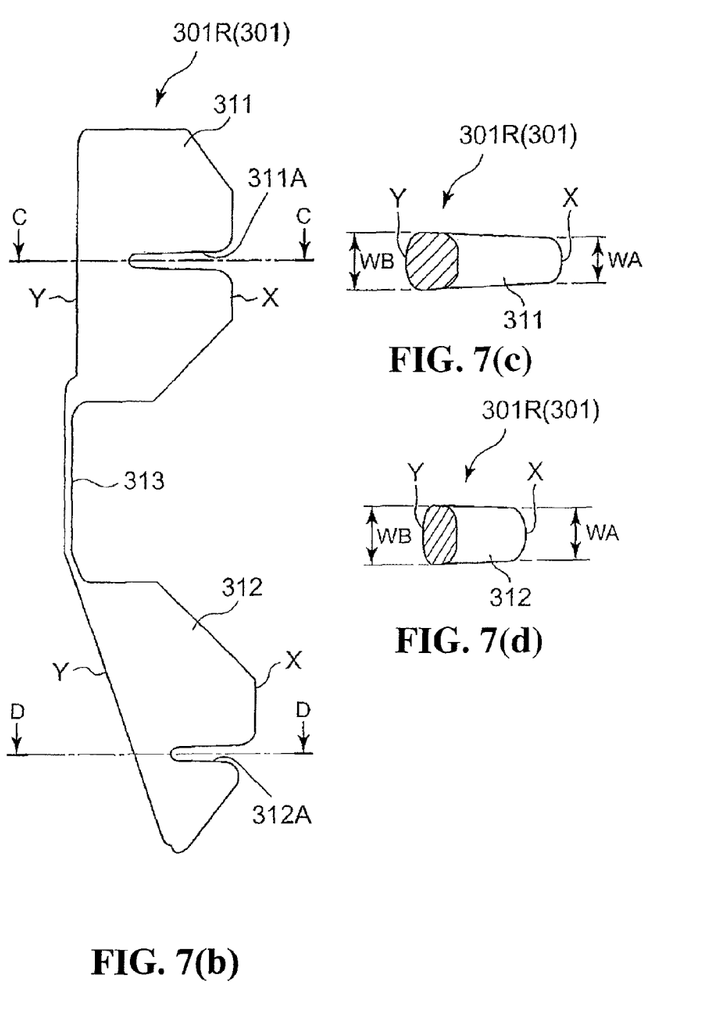
FIG. 7(b) is a side view of the first vibration isolating rubber.
FIG. 7(c) is a cross-sectional view taken along a line C-C in FIG. 7(b)
FIG. 7(d) is a cross-sectional view taken along a line D-D in FIG. 7(b)

FIG. 7(a) is a front view of the first vibration isolating rubber 301R, FIG. 7(b) is a side view of the first vibration isolating rubber 301R, FIG. 7(c) is a cross-sectional view taken along a line C-C in FIG. 7(b), and FIG. 7(d) is a cross-sectional view taken along a line D-D in FIG. 7(b).

The first vibration isolating rubber 301R is an elastic part made of an elastic material such as rubber and possesses the vibration isolating property. As shown in FIG. 5 and FIGS. 7(a) to 7(d), the first vibration isolating rubber 301R includes, as integral parts thereof, a first rubber portion 311 which constitutes a part inserted into the first recessed portion 231 of the first protruding portion 212R, a second rubber portion 312 which constitutes a part inserted into the second recessed portion 232, and a thin-plate-shaped connecting rubber portion 313 which constitutes a connection portion which connects the first rubber portion 311 and the second rubber portion 312 to each other.

The first rubber portion 311 has a convex shape which is fitted into the concave shape of the first recessed portion 231 (see FIG. 5) between the wall members 212A, 212B, and has a groove 311A into which the second rib 222 which is formed of a vertical rib is inserted.

Further, as shown in FIG. 7(c), the first rubber portion 311 has a cross-sectional shape such that a width of the first rubber portion 311 is gradually narrowed as the first rubber portion 311 extends toward a distal end portion thereof which is inserted into the first recessed portion 231 with predetermined inclination, and a width WA of the distal end portion X which is inserted into the first recessed portion 231 is set smaller than a distance WR between the pair of left and right wall members 212A, 212B, and a width WB of a proximal end portion Y of the first rubber portion 311 is set larger than the distance WR.

Further, the second rubber portion 312 has a convex shape which is fitted into a concave shape of the second recessed portion 232 (see FIG. 5) between the left and right wall members 212A, 212B, and has a groove 312 into which the third rib 223 formed of a vertical rib is inserted.

As shown in FIG. 7(d), in the same manner as the first rubber portion 311, the second rubber portion 312 also has a tapered shape such that a width of the second rubber portion 312 is gradually narrowed as the second rubber portion 312 extends toward a distal end portion X thereof, and a width WA of the distal end portion X of the second rubber portion 312 which is inserted into the second recessed portion 232 is set smaller than the distance WR between the pair of left and right wall members 212A, 212B, and a width WB of a proximal end portion Y of the second rubber portion 312 is set larger than the distance WR.

The connecting rubber portion 313 has a thin plate shape with a predetermined width narrower than widths of both rubber portions 311, 312 and extends between the first rubber portion 311 and the second rubber portion 312. The connecting rubber portion 313 can be easily bent by elastic deformation. Accordingly, by bending the connecting rubber portion 313, the first rubber portion 311 of the first vibration isolating rubber 301R can be directed to the first recessed portion 231 of the first protruding portion 212R, and the second rubber portion 312 of the first vibration isolating rubber 301R can be directed to the second recessed portion 232 of the first protruding portion 212R.

In mounting the first vibration isolating rubber 301R, by inserting the first rubber portion 311 of the first vibration isolating rubber 301R into the first recessed portion 231 of the first protruding portion 212R from a lower end side of the lower crankcase 3L, as shown in FIG. 5, it is possible to fit the first rubber portion 311 into the first recessed portion 231.

Here, the first rubber portion 311 is fowled into a shape corresponding to an inner shape of the first recessed portion 231, and the width WB of the proximal end portion Y of the first rubber portion 311 is set larger than the distance WR between the left and right wall members 212A, 212B. Accordingly, the first rubber portion 311 is shrunken in the inside of the left and right wall members 212A, 212B so that the first rubber portion 311 is brought into close contact with the left and right wall members 212A, 212B, and is held in a state where the first recessed portion 231 is substantially filled with the first rubber portion 311. Due to such a constitution, the first vibration isolating rubber 301R is press-fitted into the first protruding portion 212R of the lower crankcase 3L.

In the same manner, by inserting the second rubber portion 312 of the first vibration isolating rubber 301R into the second recessed portion 232 of the first protruding portion 212R from a back surface side (side-surface side) of the lower crankcase 3L, it is possible to fit the second rubber portion 312 into the second recessed portion 232. Here, in the inside of the second recessed portion 232, the second rubber portion 312 is sandwiched by the left and right wall members 212A, 212B, is brought into close contact with the left and right wall members 212A, 212B, and is held in a state where the second recessed portion 232 is substantially filled with the second rubber portion 312 whereby the second rubber portion 312 is press-fitted into the first protruding portion 212R of the lower crankcase 3L.

When the first rubber portion 311 and the second rubber portion 312 are inserted into the first protruding portion 212R as described above, as shown in FIG. 5, the connecting rubber portion 313 arranged between the first rubber portion 311 and the second rubber portion 312 surrounds an outer periphery of the rear lower boss 202, and is brought into close contact with the outer periphery of the rear lower boss 202.

Next, the second protruding portion 212L is explained.

A pair of left and right wall members 212A, 212B which constitutes the second protruding portion 212L is, as shown in FIG. 4, integrally formed with the lower crankcase 3L with a distance WL therebetween, and both wall members 212A, 212B has the same shape. Here, the distance WL may be equal to or different from the distance WR on the first protruding portion 212R side.

As shown in FIG. 6, a width of the wall member 212A is gradually narrowed as the wall member 212A extends in the rearward and downward direction from the rear wall 3LR of the lower crankcase 3L thus exhibiting an approximately triangular shape as viewed in a side view, and the rear lower boss 202 is formed on a vertex portion of the wall member 212A positioned at a rear lower end of the wall member 212A.

A lower surface 212M of the wall member 212A is formed of an inclined surface extending along a surface (horizontal surface in the constitution of this embodiment) which extends along an oil pan connecting surface 251S constituting a bottom surface of the lower crankcase 3L. A back surface 212N of the wall member 212A is formed of an inclined surface which is inclined in the rearward and downward direction from a position above the oil pan connecting surface 251S. Due to such a constitution, the wall member 212A is formed into a triangular shape having an acute angle (a vertex angle ranging from approximately 60° to 80° in the constitution of this embodiment) in which the rear lower boss 202 constitutes a vertex.

Also with respect to the second protruding portion 212L, the wall member 212B has the same shape as the wall member 212A and is formed at a position where the wall member 212B and the wall member 212A overlap to each other as viewed in a side view and hence, the explanation of the shape and the like of the wall member 212B is omitted.

As shown in FIG. 4 and FIG. 6, between the left and right wall members 212A, 212B, the rear lower boss 202, a first rib 221 which is an inclined rib extending linearly in the rearward and downward direction between the rear wall 3LR and the rear lower boss 202, and a second rib 222 and a third rib 223 which makes a vertical pair and extends linearly in the radial direction from an area in the vicinity of a proximal end portion of the first rib 221 are formed. The rear lower boss 202 and the first to third ribs 221 to 223 extend between the left and right wall members 212A, 212B in the vehicle widthwise direction thus enhancing the connection strength between the left and right wall members 212A, 212B.

The second rib 222 is formed of a vertical rib extending in the vertical direction, and protrudes to a position in the vicinity of a bottom surface 212M of the wall members 212A, 212B. The third rib 223 is formed of a rib extending in the direction perpendicular to the second rib 222, that is, a horizontal rib extending in the horizontal and rearward direction, and the third rib 223 protrudes to a position in the vicinity of the back surface 212N of the wall members 212A, 212B.

In this manner, also with respect to the second protruding portion 212L, between the left and right wall members 212A, 212B, a first recessed portion 231 and a second recessed portion 232 which constitute a pair of recessed portions partitioned by the first rib 221 are formed. The first recessed portion 231 has a concave shape which opens on a lower end side of the crankcase 3, and the second recessed portion 232 has a concave shape which opens on a back surface side (side-surface side) of the crankcase 3.

Next, the second vibration isolating rubber 301L is explained.

Figure 8A:
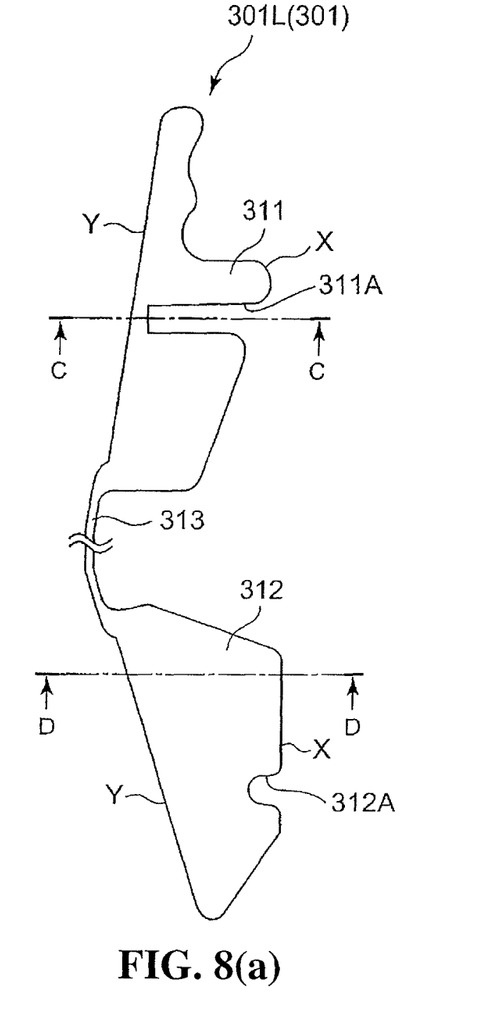
FIG. 8(a) is a side view of a second vibration isolating rubber.
Figure 8B:
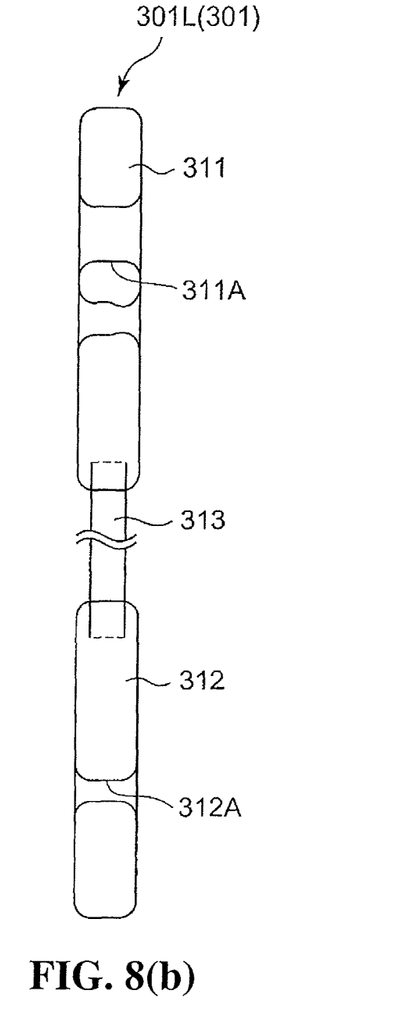
FIG. 8(b) is a back view of the second vibration isolating rubber.
Figure 8C:
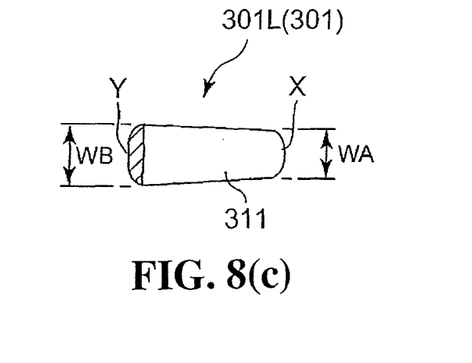
FIG. 8(c) is a cross-sectional view taken along a line C-C in FIG. 8(a)
Figure 8D:
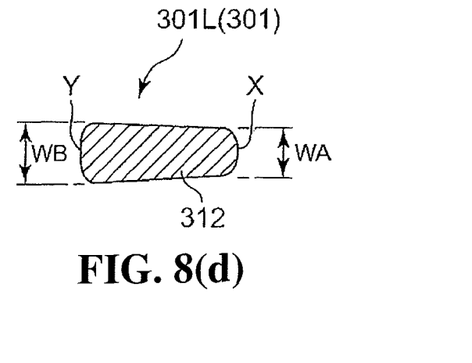
FIG. 8(d) is a cross-sectional view taken along a line D-D in FIG. 8(a)

FIG. 8(a) is a side view of the second vibration isolating rubber 301L, FIG. 8(b) is a back view of the second vibration isolating rubber 301L, FIG. 8(c) is a cross-sectional view taken along a line C-C in FIG. 8(a), and FIG. 8(d) is a cross-sectional view taken along a line D-D in FIG. 8(a).

The second vibration isolating rubber 301L is an elastic part made of an elastic material such as rubber and possesses the vibration isolating property. As shown in FIG. 6 and FIGS. 8(a) to 8(d), the second vibration isolating rubber 301L includes, as integral parts thereof, a first rubber portion 311 which constitutes a part inserted into the first recessed portion 231 of the second protruding portion 212L, a second rubber portion 312 which constitutes a part inserted into the second recessed portion 232, and a thin-plate-shaped connecting rubber portion 313 which constitutes a connection portion which connects the first rubber portion 311 and the second rubber portion 312 to each other.

The first rubber portion 311 has a convex shape which is fitted into the concave shape of the first recessed portion 231 (see FIG. 6) between the wall members 212A, 212B, and has a groove 311A into which the second rib 222 which is formed of a vertical rib is inserted.

Further, as shown in FIG. 8(c), the first rubber portion 311 has a cross-sectional shape such that a width of the first rubber portion 311 is gradually narrowed with predetermined inclination as the first rubber portion 311 extends toward a distal end portion X thereof which is inserted into the first recessed portion 231, and a width WA of the distal end portion X which is inserted into the first recessed portion 231 is set smaller than a distance WL between the pair of left and right wall members 212A, 212B, and a width WB of a proximal end portion Y of the first rubber portion 311 is set larger than the distance WL.

Further, the second rubber portion 312 has a convex shape which is fitted into a concave shape of the second recessed portion 232 (see FIG. 6) between the left and right wall members 212A, 212B, and has a groove 312A into which the third rib 223 formed of a vertical rib is inserted.

As shown in FIG. 8(d), also with respect to the second rubber portion 312, in the same manner as the first rubber portion 311, the second rubber portion 312 also has a cross-sectional shape such that a width of the second rubber portion 312 is gradually narrowed with predetermined inclination as the second rubber portion 312 extends toward a distal end portion X which is inserted into the second recessed portion 232, and a width WA of the distal end portion X of the second rubber portion 312 which is inserted into the second recessed portion 232 is set smaller than the distance WL between the pair of left and right wall members 212A, 212B, and a width WB of a proximal end portion Y of the second rubber portion 312 is set larger than the distance WL.

The connecting rubber portion 313 has a thin plate shape with a predetermined width narrower than widths of both rubber portions 311, 312 and extends between the first rubber portion 311 and the second rubber portion 312. The connecting rubber portion 313 can be easily bent by elastic deformation.

Due to such a constitution, in mounting the second vibration isolating rubber 301L, by inserting the first rubber portion 311 of the second vibration isolating rubber 301L into the first recessed portion 231 of the second protruding portion 212L from a lower end side of the lower crankcase 3L, it is possible to fit the first rubber portion 311 into the first recessed portion 231, and by inserting the second rubber portion 312 of the second vibration isolating rubber 301L into the second recessed portion 232 of the second protruding portion 212L from a back surface side of the lower crankcase 3L, it is possible to fit the second rubber portion 312 into the second recessed portion 232.

Here, the first rubber portion 311 and the second rubber portion 312 are fowled into a shape corresponding to inner shapes of the first recessed portion 231 and the second recessed portion 232, and the widths WB of the proximal end portions Y of the first rubber portion 311 and the second rubber portion 312 are set larger than the above-mentioned distance WL. Accordingly, the first rubber portion 311 and the second rubber portion 312 are brought into close contact with the left and right wall members 212A, 212B, and are held in a state where the first recessed portion 231 and the second recessed portion 232 are substantially filled with the first rubber portion 311 and the second rubber portion 232 respectively. Due to such a constitution, the second vibration isolating rubber 301L is press-fitted into the second protruding portion 212L of the lower crankcase 3L.

Further, when the first rubber portion 311 and the second rubber portion 312 are inserted into the second protruding portion 212L, as shown in FIG. 6, the connecting rubber portion 313 arranged between the first rubber portion 311 and the second rubber portion 312 surrounds an outer periphery of the rear lower boss 202, and is brought into close contact with the outer periphery of the rear lower boss 202.

As has been explained heretofore, by press-fitting the vibration isolating rubber 301 (301R, 301L) between the pair of left and right wall members 212A, 212B which constitute the protruding portions 212, the vibrations of the pair of left and right wall members 212A, 212B and the ribs 221 to 223 between the wall members 212A, 212B and the like are attenuated by the vibration isolating rubber 301 so that the generation of sounds attributed to vibrations can be suppressed.

Further, the connecting rubber portion 313 of the vibration isolating rubber 301 is brought into close contact with the outer periphery of the rear lower boss 202 on the distal end side of the protruding portion 212 and hence, the vibrations of the rear lower boss 202 can be attenuated by the connecting rubber portion 313 whereby the generation of sounds can be suppressed, and the connecting rubber portion 313 can be made to function as a guard member for the rear lower boss 202.

Next, the oil pan 3G is explained.

Figure 9A:
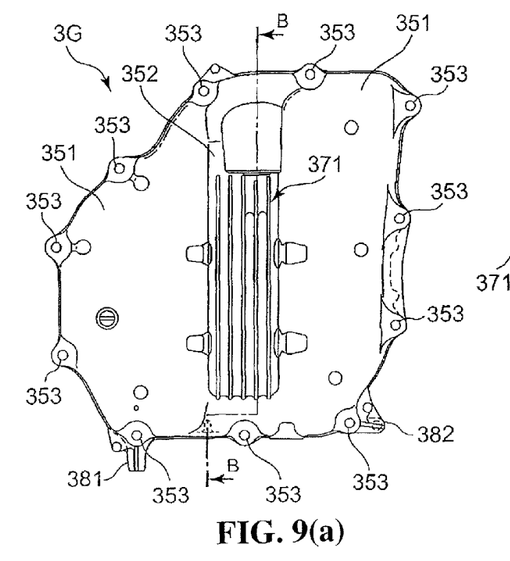
FIG. 9(a) is a view of an oil pan as viewed from below.
Figure 9B:
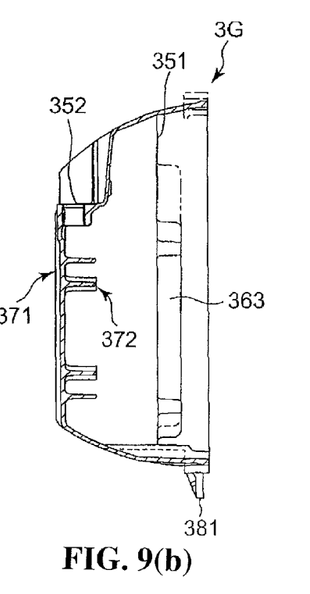
FIG. 9(b) is a cross-sectional view taken along a line B-B in FIG. 9(a)
Figure 9C:
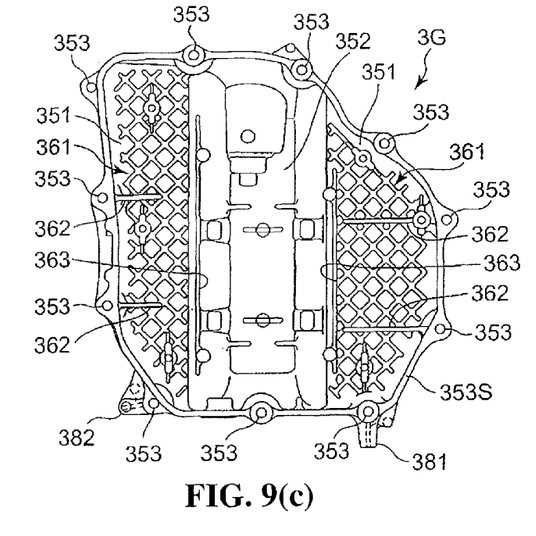
FIG. 9(c) is a view of the oil pan as viewed from above.

FIG. 9(a) is a view of the oil pan 3G as viewed from below, FIG. 9(b) is a cross-sectional view taken along a line B-B in FIG. 9(a), and FIG. 9(c) is a view of the oil pan 3G as viewed from above.

As shown in these drawings, the oil pan 3G has a bowl shape with an upper side open-ended. The oil pan 3G includes a pair of left and right bottom plate portions 351 which extends toward the center of the oil pan 3G in the vehicle width direction from both left and right sides of the oil pan 3G, and an oil pooling portion 352 which constitutes a deepest portion which is deepest between the pair of left and right bottom plate portions 351. The oil pan 3G has a crankcase connecting surface 353S which is endlessly and contiguously formed along a periphery of the oil pan 3G (see FIG. 9(c)).

The crankcase connecting surface 353S constitutes an uppermost surface of the oil pan 3G, and can be overlapped with an oil pan connecting surface 251S of the lower crankcase 3L. Hole portions 353 which are communicated with a plurality of fastening holes 253 formed in the oil pan connecting surface 251S are formed in the crankcase connecting surface 353S, and the oil pan 3G is connected to the lower crankcase 3L from below using a plurality of bolts 255 (see FIG. 3).

The oil pan 3G functions as an oil pooling portion for pooling oil for lubricating the internal combustion engine 1 (so-called engine oil). Oil in the oil pan 3G is collected in the oil pooling portion 352, and is supplied to the respective portions of the internal combustion engine 1 by means of the oil pump 50 (see FIG. 2).

On upper surfaces of the left and right bottom plate portions 351 of the oil pan 3G, grid-like ribs 361 which extend over the approximately whole upper surface is formed. Also on the upper surfaces of the left and right bottom plate portions 351 of the oil pan 3G, a plurality of lateral ribs 362 which extend in the lateral direction (vehicle width direction) and longitudinal ribs 363 which extend in the longitudinal direction in boundary portions formed between the bottom plate portions 351 and the oil pooling portions 352 are formed so as to enhance the strength of the bottom plate portions 351 by these ribs 361 to 363. Here, the grid-like ribs 361 are formed of grid-like ribs which extend neither in the longitudinal direction nor in the lateral direction of the vehicle body but extend in the oblique directions as viewed from above, that is, at an angle of 45 degrees on a right side and at an angle of 45 degrees on a left side assuming the frontward direction of the vehicle body is set to 0 degree. All ribs 361 to 363 differ from each other in the extending direction so that the strength of the whole bottom plate portion 351 can be efficiently enhanced.

Further, a plurality of longitudinal ribs 371 which extend in the longitudinal direction are formed on a lower surface of the oil pooling portion 352 of the oil pan 3G, and a plurality of lateral ribs 372 are formed on an upper surface of the oil pooling portion 352 of the oil pan 3G so that the strength of the whole oil pooling portion 311 is enhanced by these ribs 371, 372.

By enhancing the strength of the whole oil pan 3G in this manner, it is possible to enhance the case rigidity of the internal combustion engine 1 including the lower crankcase 3L to which the oil pan 3G is connected.

Further, on an upper end of the oil pan 3G, a first flange portion 381 which extends rearward from a right rear corner portion of the oil pan 3G, and a second flange portion 382 which extends to the outside in the vehicle width direction from a left rear corner portion of the oil pan 3G are integrally formed. When the oil pan 3G is connected to the lower crankcase 3L, as shown in FIG. 5, the first flange portion 381 is brought into contact with a first vibration isolating rubber 301R from below, and as shown in FIG. 6, the second flange portion 382 is brought into contact with a second vibration isolating rubber 301L from below. Accordingly, it is possible to prevent the removal of the first vibration isolating rubber 301R by the first flange portion 381, and it is also possible to prevent the removal of the second vibration isolating rubber 301L by the second flange portion 382.

In this manner, the first and second flange portions 381, 382 for preventing the removal of the first and second vibration isolating rubbers 301R, 301L are integrally formed on the oil pan 3G and hence, the removal of the first and second vibration isolating rubbers 301R, 301L can be prevented so that the number of parts can be reduced compared to a case where removal preventing members are provided separately.

As has been explained heretofore, according to this embodiment, the protruding portion 212 which is formed on the outer surface of the crankcase 3 is constituted of the pair of left and right wall members 212A, 212B, and the vibration isolating rubber 301 is fitted between the wall members 212A, 212B. Due to such a constitution, it is possible to prevent the generation of sounds from the protruding portion 212, and it is no more necessary to increase the strength of the protruding portion 212 by increasing the thickness of the protruding portion 212 or the like for preventing the generation of sounds. Accordingly, the generation of sounds from the protruding portion 212 can be prevented and the crankcase can be made light-weighted.

Further, the protruding portion 212 is formed on the bottom surface of the crankcase 3, and the portion of the vibration isolating rubber 301 is fitted upward from the bottom surface of the crankcase 3 and is prevented from being removed by the first flange portion 381 and the second recessed portion 382 formed on the upper end of the oil pan 3G. Due to such a constitution, the prevention of the removal of the vibration isolating rubber 301 can be achieved simultaneously with the mounting of the oil pan 3G on the crankcase 3 without using a special stopper whereby it is possible to realize the enhancement of the operability and the reduction of cost.

Further, the protruding portion 212 protrudes in an approximately triangular shape with the rear lower boss 202 forming a vertex of the approximately triangular shape, the vibration isolating rubber 301 is divided into the first rubber portion 311 which is the portion inserted from the lower end side of the crankcase 3 and the second rubber portion 312 which is the portion inserted from a side-surface side (back surface side in this constitution) of the crankcase 3, and both rubber portions 311, 312 are integrally connected to each other by the connecting rubber portion 313 which is the connecting portion which surrounds the outer periphery of the rear lower boss 202. Due to such a constitution, parts are hardly removed at the time of performing an operation of mounting respective parts of the vibration isolating rubber 301 and hence, the operability can be enhanced. Further, the number of parts can be reduced so that the parts management can be easily performed.

Further, the first to third ribs 221 to 223 which connect both wall members 212A, 212B of the protruding portion 212 to each other is formed on both wall members 212A, 212B, and the recessed portions 311A, 312A into which the second and third ribs 222, 223 are fitted are formed on the vibration isolating rubber 301. Due to such a constitution, it is possible to make the removal of the vibration isolating rubber 301 more difficult while increasing the strength of the protruding portion 212.

Further, the thickness of the inserting distal end portion X of the vibration isolating rubber 301 is set smaller than the distances WR, WL between both wall members 212A, 212B. Due to such a constitution, the vibration isolating rubber 301 can be easily inserted between both wall members 212A, 212B. Further, the thickness of the proximal end portion Y of the vibration isolating rubber 301 is set larger than the distances WR, WL between both wall members 212A 212B. Due to such a constitution, it is possible to make the removal of the vibration isolating rubber 301 difficult.

The above-mentioned embodiment merely shows one mode of the present invention, and various modifications and applications of the present invention are conceivable without departing from the gist of the present invention.

For example, in the above-mentioned embodiment, the rear lower boss 202 is formed on the outer surface of the crankcase 3 by way of the protruding portion 212, and the vibration isolating rubber 301 is fitted into the protruding portion 212. However, the present invention is not limited to such a constitution, and another boss such as a front boss 201 or the like may be formed on an outer surface of a crankcase by way of a protruding portion, and a vibration isolating rubber 301 may be fitted into the protruding portion.

To give one example, a protruding portion which protrudes frontward may be formed on a front wall of a crankcase 3, the protruding portion may be constituted of a pair of left and right wall members, and a vibration isolating rubber 301 may be fitted between both wall members. In this case, a first rubber portion 311 of the vibration isolating rubber 301 may be inserted from a lower end side of the crankcase 3, and a second rubber portion 312 of the vibration isolating rubber 301 may be inserted from a side-surface side (front surface side) of the crankcase 3. In this case, it is possible to prevent the generation of sounds from the vicinity of the protruding portion arranged on a front side of the crankcase 3.

Further, in the above-mentioned embodiment, the explanation has been made with respect to the case where the present invention is applied to the internal combustion engine 1 of the motorcycle 100 shown in FIG. 1. However, the present invention is not limited to such a case, and is broadly applicable to an internal combustion engine of a small-sized vehicle such as a saddle-ride-type vehicle. Here, the saddle-ride-type vehicle includes vehicles on which a rider rides in a straddling manner, and is a vehicle which includes not only a motorcycle (including a bicycle with a prime mover) but also a three-wheeled vehicle and a four-wheeled vehicle which are classified into an ATV (terrain traveling vehicle) or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crankcase of an internal combustion engine in which a boss is formed on an outer surface of the crankcase by way of a protruding portion,
    wherein the protruding portion is constituted of a pair of left and right wall members, and a vibration isolating rubber is fitted between the wall members surrounding an outer periphery of the boss,
    wherein the protruding portion is formed on a bottom surface of the crankcase, and a portion of the vibration isolating rubber is fitted upward from the bottom surface of the crankcase such that the vibration isolating rubber is prevented from being removed by a flange portion formed on an upper end of an oil pan.

2. The crankcase of an internal combustion engine according to claim 1, wherein the protruding portion protrudes in an approximately triangular shape with the boss forming a vertex of the approximately triangular shape, the vibration isolating rubber is divided into a first portion which is inserted from a lower end side of the crankcase and a second portion which is inserted from a side-surface side of the crankcase, and the first portion and the second portion are integrally connected to each other by a connecting portion which surrounds an outer periphery of the boss.

3. The crankcase of an internal combustion engine according to claim 2, wherein a rib which connects the left and right wall members of the protruding portion to each other is formed on each of the wall members, and two recessed portions into which the ribs are respectively fitted are formed on the vibration isolating rubber.

4. The crankcase of an internal combustion engine according to claim 2, wherein a thickness of an inserting distal end portion of the vibration isolating rubber is set smaller than a distance between the left and right wall members, and a thickness of a proximal end portion of the vibration isolating rubber is set larger than a distance between the left and right wall members.

5. The crankcase of an internal combustion engine according to claim 1, wherein a rib which connects the right and left wall members of the protruding portion to each other is formed on each of the wall members, and two recessed portions into which the ribs are respectively fitted are formed on the vibration isolating rubber.

6. The crankcase of an internal combustion engine according to claim 1, wherein a thickness of an inserting distal end portion of the vibration isolating rubber is set smaller than a distance between the left and right wall members, and a thickness of a proximal end portion of the vibration isolating rubber is set larger than a distance between the left and right wall members.

7. The crankcase of an internal combustion engine according to claim 1, wherein the protruding portion is provided on a lower rear corner of the crankcase, and a bottom wall portion of the crankcase adjacent to the protruding portion is reinforced by a diagonal rib.

8. A crankcase of an internal combustion engine according to claim 5, in which a boss is formed on an outer surface of the crankcase by way of a protruding portion, wherein the protruding portion is constituted of a pair of left and right wall members, and a vibration isolating rubber is fitted between the wall members,
    wherein a rib which connects the right and left wall members of the protruding portion to each other is formed on each of the wall members, and two recessed portions into which the ribs are respectively fitted are formed on the vibration isolating rubber, and wherein a thickness of an inserting distal end portion of the vibration isolating rubber is set smaller than a distance between the left and right wall members, and a thickness of a proximal end portion of the vibration isolating rubber is set larger than a distance between the left and right wall members.

9. The crankcase of an internal combustion engine according to claim 8, wherein the protruding portion is formed on a bottom surface of the crankcase, and a portion of the vibration isolating rubber is fitted upward from the bottom surface of the crankcase such that the vibration isolating rubber is prevented from being removed by a flange portion formed on an upper end of an oil pan.

10. The crankcase of an internal combustion engine according to claim 9, wherein the protruding portion protrudes in an approximately triangular shape with the boss forming a vertex of the approximately triangular shape, the vibration isolating rubber is divided into a first portion which is inserted from a lower end side of the crankcase and a second portion which is inserted from a side-surface side of the crankcase, and the first portion and the second portion are integrally connected to each other by a connecting portion which surrounds an outer periphery of the boss.

11. The crankcase of an internal combustion engine according to claim 9, wherein a rib which connects the right and left wall members of the protruding portion to each other is formed on each of the wall members, and two recessed portions into which the ribs are respectively fitted are formed on the vibration isolating rubber.

12. The crankcase of an internal combustion engine according to claim 9, wherein a thickness of an inserting distal end portion of the vibration isolating rubber is set smaller than a distance between the left and right wall members, and a thickness of a proximal end portion of the vibration isolating rubber is set larger than a distance between the left and right wall members.

13. The crankcase of an internal combustion engine according to claim 8, wherein the protruding portion is provided on a lower rear corner of the crankcase, and a bottom wall portion of the crankcase adjacent to the protruding portion is reinforced by a diagonal rib.

14. A crankcase of an internal combustion engine in which a boss is formed on an outer surface of a rear portion of the crankcase by way of a protruding portion, wherein the protruding portion is constituted of a pair of left and right wall members, and a vibration isolating rubber is fitted between the wall members wherein the protruding portion is provided on a lower rear corner of the crankcase, and a bottom wall portion of the crankcase adjacent to the protruding portion is reinforced by a diagonal rib.

15. The crankcase of an internal combustion engine according to claim 14, wherein the protruding portion is formed on a bottom surface of the crankcase, and a portion of the vibration isolating rubber is fitted upward from the bottom surface of the crankcase such that the vibration isolating rubber is prevented from being removed by a flange portion formed on an upper end of an oil pan.

16. The crankcase of an internal combustion engine according to claim 15, wherein the protruding portion protrudes in an approximately triangular shape with the boss forming a vertex of the approximately triangular shape, the vibration isolating rubber is divided into a first portion which is inserted from a lower end side of the crankcase and a second portion which is inserted from a side-surface side of the crankcase, and the first portion and the second portion are integrally connected to each other by a connecting portion which surrounds an outer periphery of the boss.

17. The crankcase of an internal combustion engine according to claim 15, wherein a rib which connects the right and left wall members of the protruding portion to each other is formed on each of the wall members, and two recessed portions into which the ribs are respectively fitted are formed on the vibration isolating rubber.

18. The crankcase of an internal combustion engine according to claim 14, wherein the protruding portion protrudes in an approximately triangular shape with the boss forming a vertex of the approximately triangular shape, the vibration isolating rubber is divided into a first portion which is inserted from a lower end side of the crankcase and a second portion which is inserted from a side-surface side of the crankcase, and the first portion and the second portion are integrally connected to each other by a connecting portion which surrounds an outer periphery of the boss.

19. The crankcase of an internal combustion engine according to claim 14, wherein a rib which connects the right and left wall members of the protruding portion to each other is formed on each of the wall members, and two recessed portions into which the ribs are respectively fitted are formed on the vibration isolating rubber.

20. The crankcase of an internal combustion engine according to claim 14, wherein a thickness of an inserting distal end portion of the vibration isolating rubber is set smaller than a distance between the left and right wall members, and a thickness of a proximal end portion of the vibration isolating rubber is set larger than a distance between the left and right wall members.

* * * * *